US009081328B2

(12) United States Patent
Kreiter

(10) Patent No.: US 9,081,328 B2
(45) Date of Patent: Jul. 14, 2015

(54) METHOD TO ADJUST THE HUE OF PRINT IMAGES IN AN ELECTROPHOTOGRAPHIC PRINTER

(71) Applicant: Alexander Kreiter, Woerth (DE)

(72) Inventor: Alexander Kreiter, Woerth (DE)

(73) Assignee: Océ Printing Systems GmbH & CO. KG, Poing (DE)

( * ) Notice: Subject to any disclaimer, the term of this patent is extended or adjusted under 35 U.S.C. 154(b) by 0 days.

(21) Appl. No.: 14/271,791

(22) Filed: May 7, 2014

(65) Prior Publication Data

US 2014/0340695 A1 Nov. 20, 2014

(30) Foreign Application Priority Data

May 16, 2013 (DE) ........................ 10 2013 105 050

(51) Int. Cl.

| | |
|---|---|
| ***G06K 15/00*** | (2006.01) |
| ***G03G 15/08*** | (2006.01) |
| ***G03G 13/04*** | (2006.01) |
| *G03G 15/043* | (2006.01) |

(52) U.S. Cl.

CPC ............ *G03G 15/0877* (2013.01); *G03G 13/04* (2013.01); *G03G 15/043* (2013.01)

(58) Field of Classification Search

USPC ........... 358/1.9, 3.01, 3.02, 3.1, 3.12; 399/51, 399/55, 56

See application file for complete search history.

(56) References Cited

U.S. PATENT DOCUMENTS

| | | | |
|---|---|---|---|
| 5,767,888 A * | 6/1998 | Schleusener et al. | 347/130 |
| 2011/0150534 A1 | 6/2011 | Kopp | |
| 2013/0279949 A1* | 10/2013 | Bucks | 399/285 |

FOREIGN PATENT DOCUMENTS

| | | | |
|---|---|---|---|
| DE | 102008048256 | A1 | 4/2010 |
| DE | 102009060334 | A1 | 6/2011 |
| DE | 102010015985 | A1 | 9/2011 |
| WO | 9418786 | A1 | 8/1994 |

* cited by examiner

*Primary Examiner* — Jamares Q Washington

(74) *Attorney, Agent, or Firm* — Schiff Hardin LLP

(57) ABSTRACT

In a method to adjust hue of a print images by toner layer thickness a photoconductor element is charged to a charge potential. A potential image of the print image made up of image points is generated via exposure and discharge of the photoconductor element. The potential image is inked by charged toner via a developer element at a BIAS potential. With a character generator, generating a potential of an individual image point of the print image via local discharge of the photoconductor element, the potential of the image point lying between the BIAS potential and a potential established by a maximum achievable discharge depth of the photoconductor element, and so that the individual image points have same or different potentials, depending on the exposure, so that the exposed area overall has a resulting potential, and a depositing of toner on this area and therefore the toner layer thickness on this area is proportional to the resulting potential.

4 Claims, 5 Drawing Sheets

METHOD TO ADJUST THE HUE OF PRINT IMAGES IN AN ELECTROPHOTOGRAPHIC PRINTER

BACKGROUND

The disclosure concerns an electrophotographic printer to print to a recording medium with toner particles of a developer mixture, which toner particles are applied with the aid of a liquid developer or dry toner mixture. In the following, liquid developer is used as an example of a developer mixture in the explanation of the exemplary embodiment, without thereby limiting the exemplary embodiment to this.

Given such printers, a charge image generated on a photoconductor is inked by means of electrophoresis with the aid of the liquid developer. The toner image that is created in such a manner is transferred onto the recording medium indirectly (via a transfer element) or directly. The liquid developer has toner particles and carrier fluid in a desired ratio. Mineral oil is advantageously used as carrier fluid. In order to provide the toner particles with an electrostatic charge, charge control substances can be added to the liquid developer. Further additives can additionally be added, for example in order to achieve the desired viscosity or a desired drying behavior of the liquid developer.

Such printers are known from DE 10 2010 015 985 A1, DE 10 2008 048 256 A1 or DE 10 2009 060 334 A1, for example.

A print group of an electrophotographic printer essentially comprises an electrophotography station, a developer station and a transfer station. The core of the electrophotography station is a photoelectric image carrier that has on its surface a photoelectric layer (what is known as a photoconductor). For example, the photoconductor is designed as a photoconductor roller that rotates past different elements to generate a print image. The photoconductor roller is initially cleaned of all contaminants. For this, an erasure light is present that erases charges remaining on the surface of the photoconductor roller. After the erasure light, a cleaning device mechanically cleans off the photoconductor roller in order to remove toner particles that are possibly still present on the surface of the photoconductor roller, possibly dust particles and remaining carrier fluid. The photoconductor roller is subsequently charged by a charging device to a predetermined charge potential. For this, for example, the charging device has a corotron device (advantageously comprising multiple corotrons). The charge potential of the photoconductor roller is controllable by adjusting the current that is supplied to the corotron device. Arranged after the charging device is a character generator that discharges the photoconductor roller via optical radiation depending on the desired print image. A latent charge image or potential image of the print image is thereby created.

The latent charge image of the print image that is generated by the character generator is inked with charged toner particles by the developer station. For this, the developer station has a rotating developer roller that directs a layer of liquid developer onto the photoconductor roller. At the developer roller, a BIAS voltage is applied, wherein a BIAS potential develops at its surface. A developer gap exists between the rollers, in which developer gap an electrical field is generated due to the developer voltage (formed by the difference between the BIAS potential at the developer roller and the discharge potential at the photoconductor roller) applied at the developer gap, due to which electrical field the charged toner particles electrophoretically migrate from the developer roller onto the photoconductor roller at the image points on the photoconductor roller. No toner passes onto the photoconductor roller in the non-image points because the direction of the electrical field (that results from the BIAS potential at the developer roller and the charge potential at the development point on the photoconductor roller) repels the charged toner particles. The inked image rotates with the photoconductor roller up to a transfer point at which the inked image is transferred onto a transfer roller. The print image can be transfer printed from the transfer roller onto the recording medium.

Corresponding to offset printing, given electrographic printing in digital printing the print images can be constructed from macrocells that respectively comprise microcells or raster cells, wherein raster points or pixels in the raster cells can be generated via exposure of the raster cells on the photoconductor, which raster points or pixels can then be developed by toner. This method has been explicitly explained in U.S. Pat. No. 5,767,888 A, and this is therefore referenced. In what is known as this raster method, the color gradation of the print images from paper color up to the full tone of a primary color can be achieved by adding additional raster points to a raster point of the color of the same thickness. The raster points thus grow step by step within the raster dimensions. The point size of the raster points can thereby be modulated by the character generator via the exposure energy of the photoconductor exposure. The modulation of the exposure energy in a raster point is thus used in order to initially adjust the size of a raster point or pixel. If a raster point has already been exposed with the highest possible exposure energy and an additional inking of the macrocell is required, a raster point or multiple adjacently situated raster points can then be used for raster formation, and their exposure can be modified step by step (thus U.S. Pat. No. 5,767,888 A).

This raster method has the following core points:

The toner application is of nearly the same thickness both in raster points and in solid areas.

The color gradation of print images is achieved via a raster made up of raster points that are more or less fine (and accordingly visible).

Shaded elements of print images are rastered; their edges are accordingly rough and inexact, in particular given an angling of these elements.

SUMMARY

It is analyzed to specify a method for an electrophotographic printer to print to a recording medium with which the hue of print images can be adjusted without the raster points in the print image being detectable.

In a method to adjust hue of a print image by toner layer thickness a photoconductor element is charged to a charge potential. A potential image of the print image made up of image points is generated via exposure and discharge of the photoconductor element. The potential image is inked by charged toner via a developer element at a BIAS potential. With a character generator, generating a potential of an individual image point of the print image via local discharge of the photoconductor element, the potential of the image point lying between the BIAS potential and a potential established by a maximum achievable discharge depth of the photoconductor element, so that the individual image points have same or different potentials, depending on the exposure, and so that the exposed area overall has a resulting potential, and a depositing of toner on this area and therefore the toner layer thickness on this area is proportional to the resulting potential.

DESCRIPTION OF EXEMPLARY EMBODIMENTS

Figure 1:
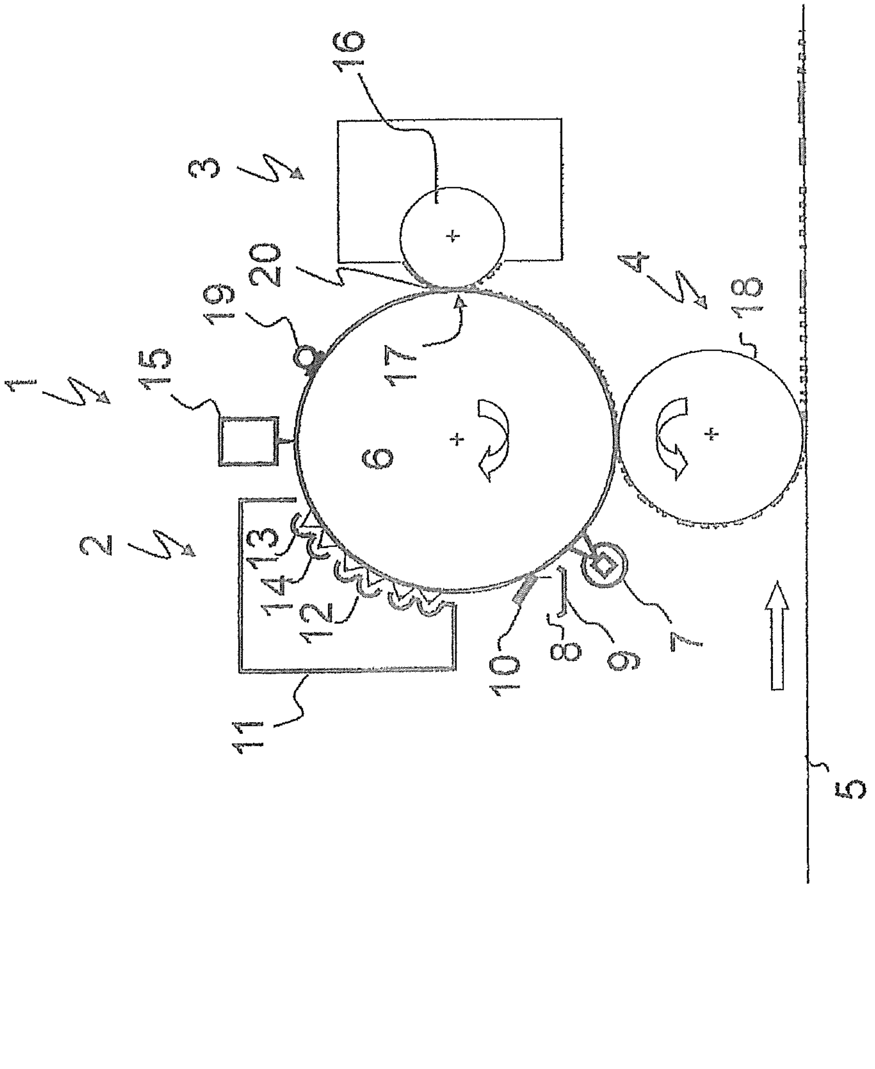
FIG. 1 is a schematic design of a print group of an electrophotographic printer.

For the purposes of promoting an understanding of the principles of the invention, reference will now be made to the preferred exemplary embodiments/best mode illustrated in the drawings and specific language will be used to describe the same. It will nevertheless be understood that no limitation of the scope of the invention is thereby intended, and such alterations and further modifications in the illustrated embodiments and such further applications of the principles of the invention as illustrated as would normally occur to one skilled in the art to which the invention relates are included herein.

To adjust the hue of print images in an electrophotographic printer, a photoconductor element is charged to a charge potential, then potential images of the print images are generated by a character generator via exposure and discharge of the photoconductor element. The potential images are inked by charged toner via a developer element having a BIAS potential if the potential of the potential images lies in a development zone that is bounded by the BIAS potential and a potential established by the greatest possible discharge depth of the photoconductor element (6). The hue of the print images is established by adjusting the toner layer thickness on the photoconductor element at an area completely exposed corresponding to the print image.

The advantage of the method is apparent in that it is independent of

- the exposure method (LED or laser);
- the photoconductor type and photoconductor design;
- the development method (toner positively or negatively charged, liquid development or dry toner development);
- the charging method;
- the rastering method (amplitude-modulated, frequency-modulated);
- the raster cell values;
- the raster rules.

An exemplary embodiment of the invention is explained in detail in the following using the drawings.

The principle design of a print group 1 is presented in FIG. 1. Such a print group 1 is based on the electrophotographic principle, in which a photoelectric image carrier 6 is inked with charged toner particles (for example with the aid of a liquid developer), and the image created in such a manner is transferred to a recording medium 5.

The print group 1 essentially comprises an electrophotography station 2, a developer station 3 and a transfer station 4.

The core of the electrophotography station 2 is a photoelectric image carrier 6 that has on its surface a photoelectric layer (what is known as a photoconductor). Here the photoconductor 6 is designed as a roller (photoconductor roller 6). The photoconductor roller 6 rotates past the different elements to generate a print image (rotation in the arrow direction).

The photoconductor roller 6 is initially cleaned of all contaminants. For this, an erasure light 7 is present that erases charges remaining on the surface of the photoconductor roller 6.

After the erasure light 7, a cleaning device 8 mechanically cleans off the photoconductor roller 6 in order to remove toner particles, possible dust particles and remaining carrier fluid that are possibly still present on the surface of the photoconductor roller 6. The cleaned-off carrier fluid is supplied to a collection container 9. The cleaning device 8 advantageously has a blade 10 that rests at an acute angle on the generated surface of the photoconductor roller 6 in order to mechanically clean off the surface.

The photoconductor roller 6 is subsequently charged by a charging device 11 (a corotron device in the exemplary embodiment) to an electrostatic charge potential. Multiple corotrons 12 are advantageously present for this. For example, the corotrons 12 have at least one wire 13 at which a high electrical voltage is applied. The air around the wire 13 is ionized by the voltage. A shield 14 can be provided as a counter-electrode. The current (corotron current) that flows across the shield 14 is adjustable so that the charge of the photoconductor roller 6 is controllable. The corotrons 12 can be fed with currents of different strengths in order to achieve a uniform and sufficiently high charge at the photoconductor roller 6.

Arranged after the charging device 11 on the photoconductor roller 6 is a discharging device (here a character generator 15) that discharges the photoconductor roller 6 via optical radiation depending on the desired print image (per pixel, for example). A latent charge image or potential image is thereby created that is inked later with toner particles (the inked image corresponds to the print image). For example, an LED character generator 15 can be used in which an LED line with many individual LEDs is arranged stationary over the entire length of the photoconductor roller 6. The LEDs can be controlled individually with regard to timing and their radiation power.

The latent image generated on the photoconductor roller 6 by the character generator 15 is inked with toner particles by the developer station 3. For this the developer station 3 has a rotating developer roller 16 that directs a layer of liquid developer onto the photoconductor roller 6. A development gap 20 exists between the surface of the photoconductor roller 6 and the surface of the developer roller 16, across which development gap 20 the charged toner particles migrate from the developer roller 16 to a development point 17 on the photoconductor roller 6 in the image points due to an electrical field. No toner particles pass to the photoconductor roller 6 in the non-image points.

The inked image rotates with the photoconductor roller 6 up to a transfer point at which the inked image is transferred onto a transfer roller 18. After the transfer of the print image onto the transfer roller 18, the print image can be transfer-printed onto the recording medium 5.

A potential measurement probe 19 with which the potential at the photoconductor roller 6 can be measured can be arranged adjacent to the photoconductor roller 6, between the character generator 15 and the developer station 3.

Figure 2:
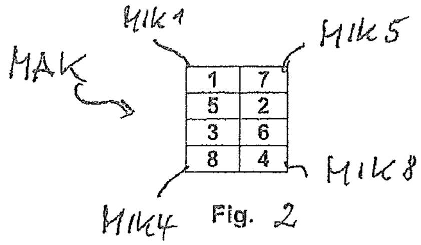
FIG. 2 shows the design of a macrocell made up of microcells.

The print images can be designed as raster images made up of macrocells MAK that respectively comprise microcells MIK (see U.S. Pat. No. 5,767,888 A). An LED can respectively be associated with a microcell MIK. The discharge depth of the microcells MIK can be set by adjusting the exposure energy of the respective LEDs. FIG. 2 shows an example of a macrocell MAK that includes 4×2 microcells MIK1 through MIK8. An LED of the character generator can be associated with each microcell MIK, via which the microcell MIK on the photoconductor roller 6 can be discharged.

Figure 4:
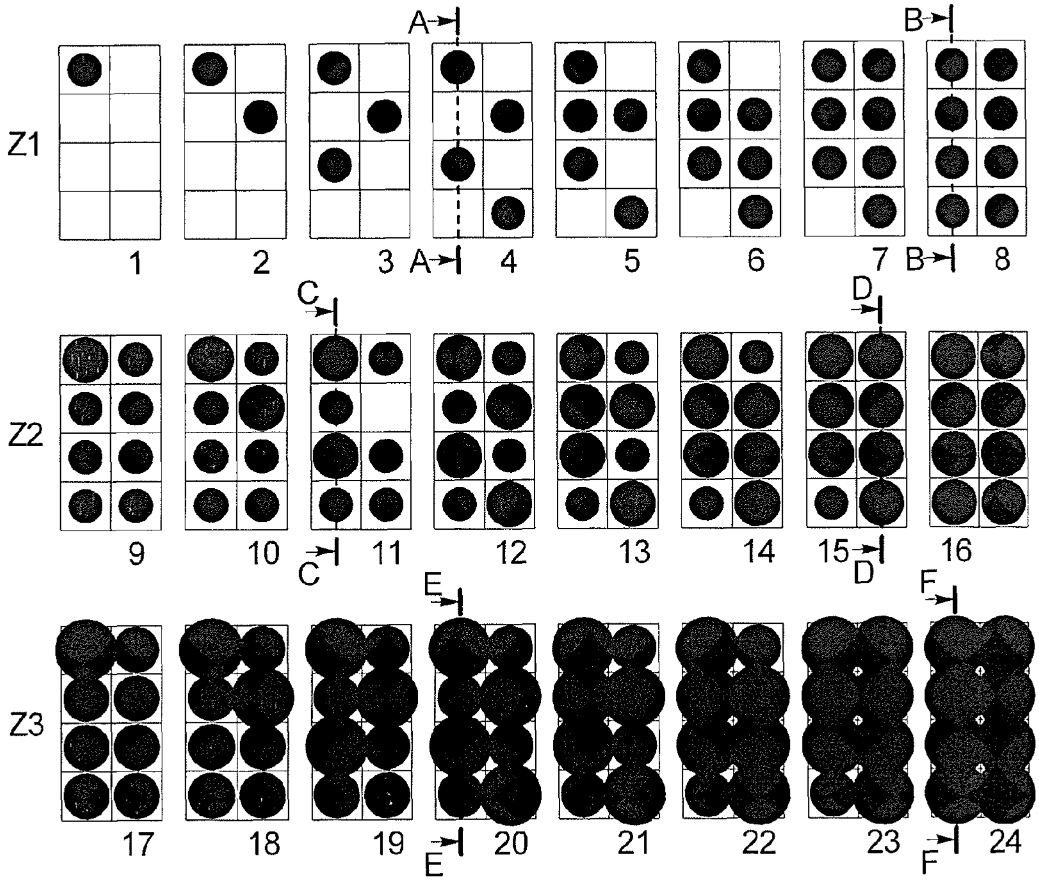
FIG. 4 illustrates macrocells whose microcells have been exposed differently.

In FIG. 2, characters are plotted as a raster rule in the microcells MIK1 through MIK8, which characters should indicate in what order the microcells MIK of the macrocell MAK are exposed in the exemplary embodiment of FIG. 4.

Figure 3:
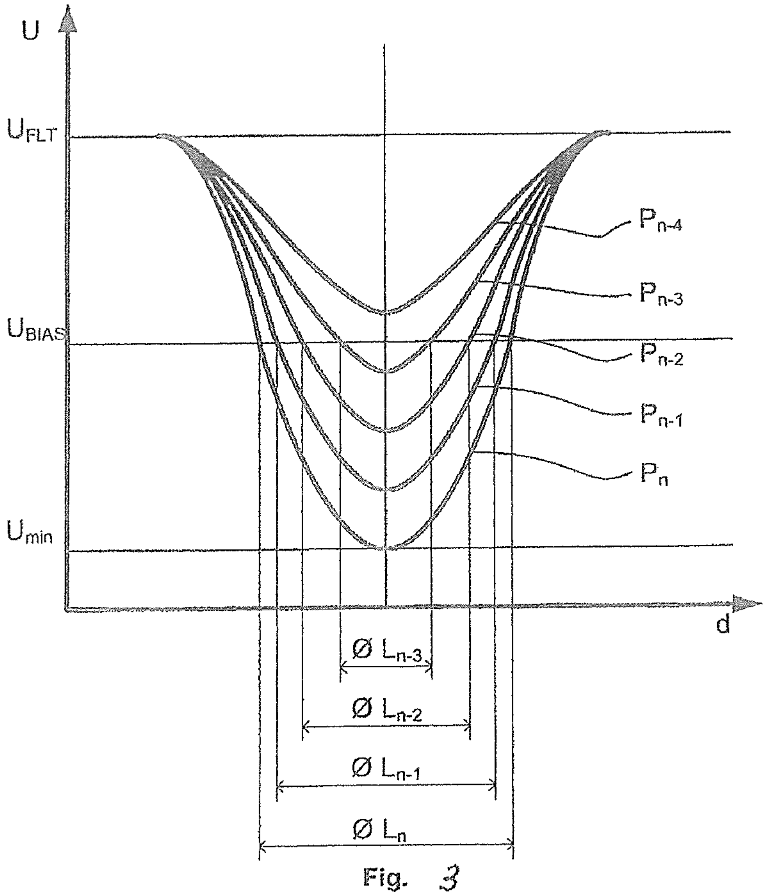
FIG. 3 shows discharge curves of a microcell given different exposure energies.

FIG. 3 shows discharge curves or potential curves P for the photoconductor 6 for a microcell MIK, wherein the potential U of the microcell MIK is plotted over the spatial extent d of the discharge at the photoconductor 6. Furthermore, plotted in FIG. 3 are:

$U_{FLT}$=the charge potential of the photoconductor 6;

$U_{min}$=the most minimal discharge potential of the photoconductor 6 upon exposure with maximum exposure energy of the exposure element of the character generator 15, for example of the LED;

$U_{BIAS}$=the BIAS potential at the development element 16 (for example a developer roller) that is used in the development of the discharged regions on the photoconductor 6;

d=extent of the discharge potentials U given different exposure energies L of the character generator 15;

$L_x$ (x=0, . . . , n)=the exposure energies that are applied at the exposure element (character generator 15). Given a character generator 15 with $2^4$=16 discrete exposure levels, n=16 would then be the case.

FIG. 3 thereby shows the paths of the discharge curves P upon exposure of the photoconductor 6 with different exposure energies L. The diameter Ø of an exposure point on the photoconductor 6 (corresponding to a raster point or pixel) results via the section of the discharge curve P with the $U_{BIAS}$ potential, wherein the path of the discharge curve P depends on the strength of the exposure by the exposure element 15. According to FIG. 3, the diameter Ø of a raster point thus depends on the BIAS potential of the development element 16 and the exposure energy L of the exposure element 15. The diameter Ø of a raster point can thus be adjusted via the exposure energy L of the exposure element 15, for example.

According to these principles, according to FIG. 4 the hue curve of a macrocell MAK can be explained depending on the exposure of their microcells MIK1 through MIK8. According to the rastering rule of FIG. 2, the microcells MIK1 through MIK8 of the macrocell MAK are exposed in succession with different exposure energies L. Examples are shown in FIG. 4:

a) First exemplary embodiment, FIG. 4, Line 1.

Figure 5:
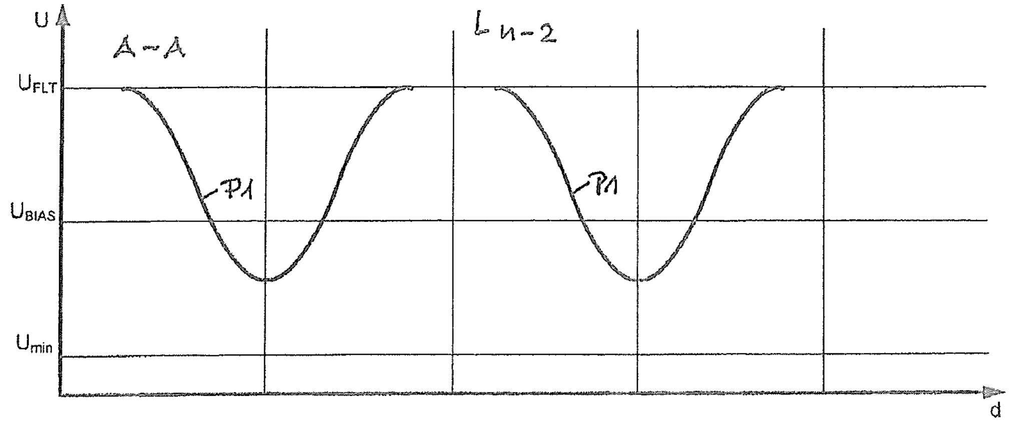
FIG. 5 through FIG. 10 illustrate discharge curves given different exposure of the microcells of a macrocell according to FIG. 4.

Here the microcells MIK are exposed in succession with an exposure energy $L_{n-2}$ according to the raster rule of FIG. 3. The exposed microcells MIK of the macrocell MAK are respectively designated with colors. The discharge curves or potential curves P1 within the macrocell MAK are presented as examples at the points A-A and B-B in FIG. 5 and FIG. 6.

At the point A-A, two microcells MIK1 and MIK3 have been exposed, between which is respectively situated an unexposed microcell MIK2 and MIK4. The associated discharge curves P1 (corresponding to FIG. 3) are shown for these microcells MIK1 and MIK3 in FIG. 5; the discharge curves P1 are situated parallel to one another such that they do not intersect. However, both discharge curves P1 fall below the development potential $U_{BIAS}$, wherein in the range negative of the development potential $U_{BIAS}$ the photoconductor 6 assumes a potential that attracts toner from a development element 16. In the range below the development potential $U_{BIAS}$—called the development zone in the following—toner thus migrates from the development element 16 onto the photoconductor 6 and there develops the microcells MIK1 and MIK3.

Figure 6:
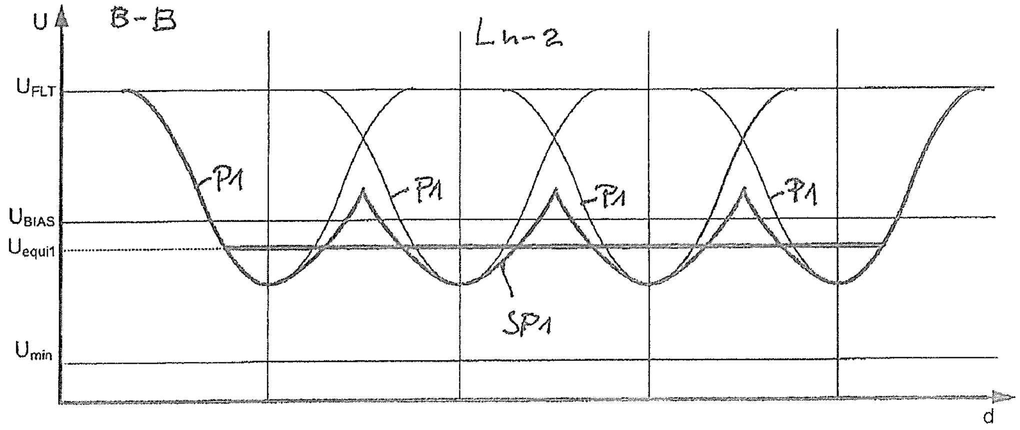

FIG. 6 shows the discharge curves P1 at the point B-B. Here all microcells MIK1 through MIK4 of a column of the macrocell MAK have been exposed with $L_{n-2}$. The discharge curves P1 of the microcells MIK1 through MIK4 now intersect, and a sum curve SP1 results (drawn with a thick line in FIG. 6) from the discharge curves P1 that travel partially below the $B_{IAS}$ potential in the development zone. The discharged raster points MIK1 through MIK4 thereby lift further away from one another. However, given development of the raster points MIK1 through MIK4 via charged toner the contours of the developed raster points scatter, and the developed area on the photoconductor 6 that results from this then appears as if it had received a flat exposure that would have been generated by a potential $U_{equi1}$ at the photoconductor 6. Given sufficiently small diameter of the toner grains, this area is filled with toner with a layer thickness that is proportional to the potential difference delta $U=U_{BIAS}-U_{equi1}$.

For example, Øpixel/Øtoner particle>10 can be the case.

b) Second exemplary embodiment, FIG. 4, Line Z2.

Figure 7:
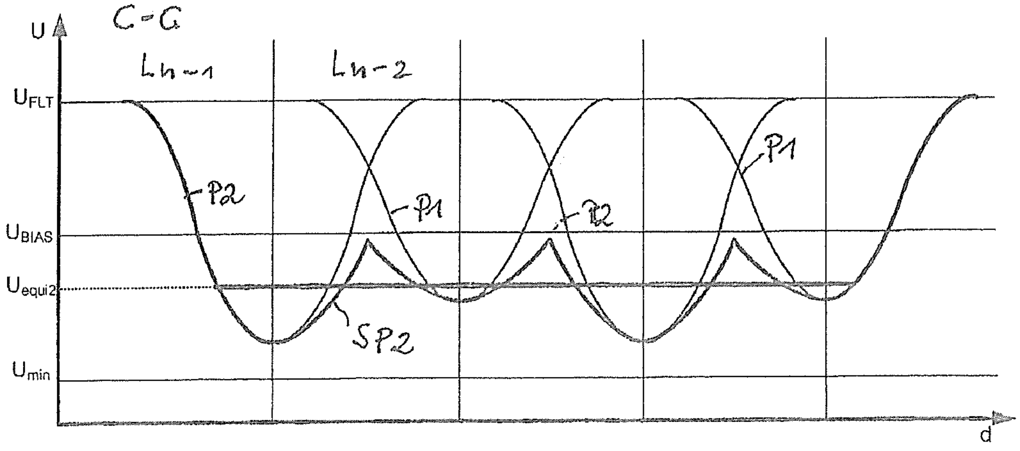

FIG. 4, second line L2 shows the relationships for the case that the microcells MIK1 through MIK8 of the macrocell MAK have initially been exposed in part with a higher exposure energy $L_{n-1}$, and at the end completely with the higher exposure energy $L_{n-1}$. Here, the microcells MIK that are not exposed with $L_{n-1}$ have been exposed with $L_{n-2}$ as an example. The associated discharge curves P1, P2 at the point C-C are shown in FIG. 7. Here the microcells MIK that are exposed with the exposure energy $L_{n-1}$ are discharged deeper in comparison to the microcells MIK that have been exposed only with the exposure energy $L_{n-2}$. The discharge curves P2 and P1 thus alternate. The sum curve SP2 lies entirely below the potential $U_{BIAS}$. A resulting potential $U_{equi2}$ results in turn that is more negative than the resulting potential $U_{equi1}$. This has the consequence that the toner layer on the photoconductor 6 grows in the development. It applies that:

$$\text{delta}U=U_{BIAS}-U_{equi2}.$$

Figure 8:
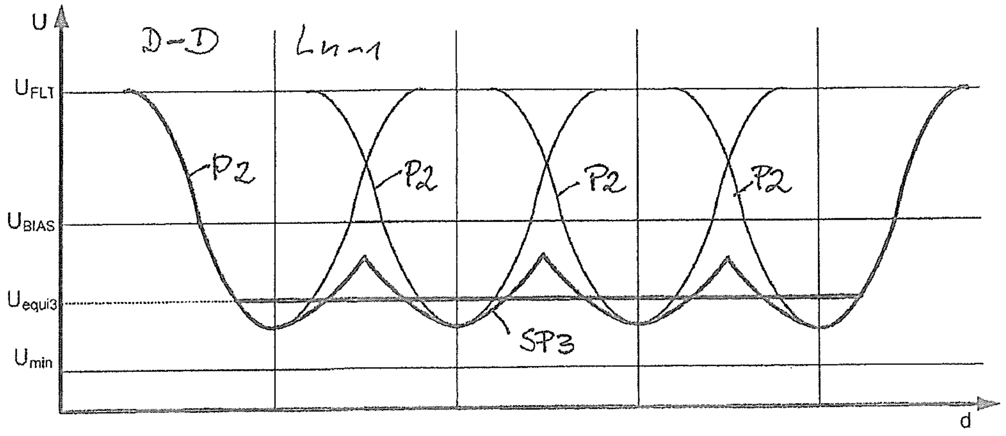

FIG. 8 shows the potential relationships at the point D-D. At the point D-D, the microcells MIK5 through MIK8 have been exposed with $L_{n-1}$. The discharge curves P2 overlap to a greater extent and form a sum curve SP3 that, in comparison to FIG. 7, lies further below the potential $U_{BIAS}$ in the developer zone (and therefore also the resulting potential $U_{equi3}$ that arises at the photoconductor 6). This has the consequence that the resulting potential $U_{equi3}$ at the photoconductor 6 is more negative in comparison to $U_{equi2}$, with the result that the toner layer on the photoconductor 6 becomes thicker in the development corresponding to delta $U=U_{BIAS}-U_{equi3}$.

c) Third exemplary embodiment, FIG. 4, Line Z3

FIG. 4, Line Z3 shows the potential relationships at the microcells MIK if these have been increasingly exposed with an exposure energy of $L_n$. Initially only one microcell MIK1 is exposed again with the exposure energy $L_n$, while the remaining microcells MIK2 through MIK8 are exposed with an exposure potential $L_{n-1}$. Increasingly more microcells MIK are exposed step by step with the exposure potential $L_n$ until ultimately all microcells MIK of the macrocell MAK have been exposed with the exposure energy $L_n$.

Figure 9:
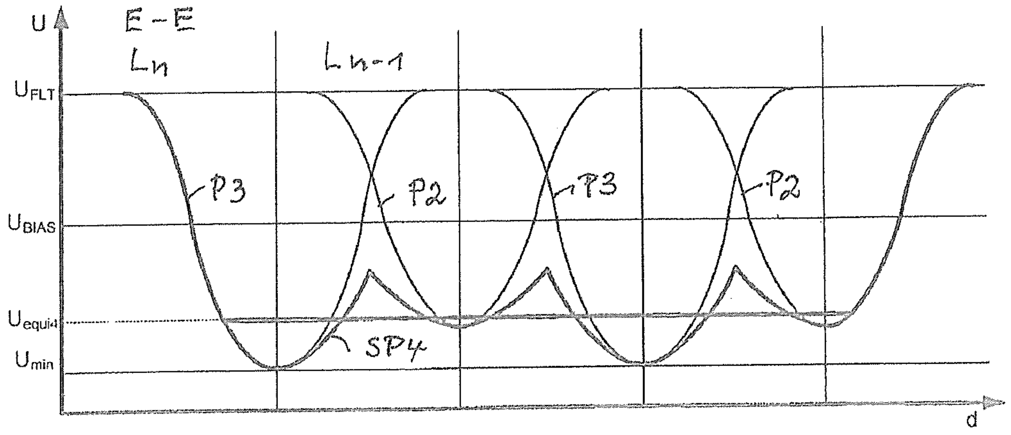

FIG. 9 shows the discharge curves P2, P3 at the point E-E. The discharge curves P2 and P3 alternate, wherein the discharge curves P3 corresponding to FIG. 3 have a deeper zenith. The sum curve SP4 and the resulting potential $U_{equi4}$ are therefore also more negative. It therefore applies that:

$$\text{delta}U=U_{BIAS}-U_{equi4}.$$

Figure 10:
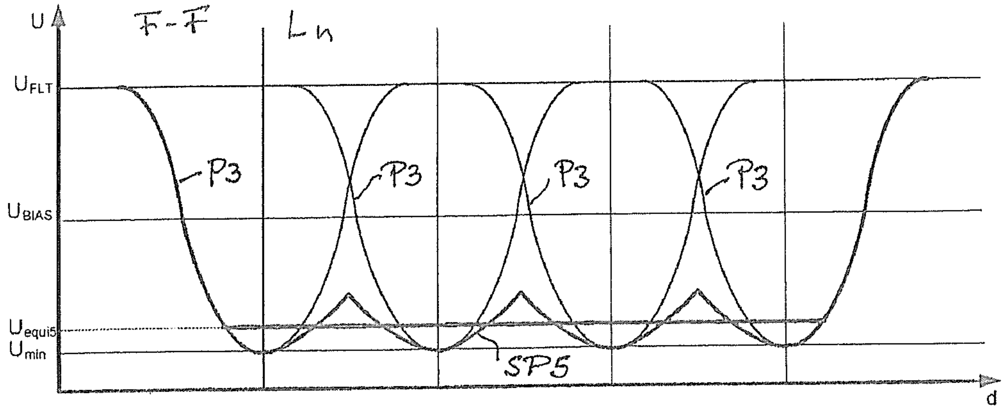

If the discharge curves P at the point F-F of line Z3 of FIG. 4 are considered, the curves P3 according to FIG. 10 result.

The sum curve SP5 now lies close to the potential $U_{min}$ of FIG. 3. The resulting potential $U_{equi5}$ that results accordingly lies adjacent to $U_{min}$. The layer thickness developed by toner on the photoconductor 6 therefore increases since the resulting potential $U_{equi5}$ migrates in the direction of $U_{min}$ (FIG. 3). It applies that $$\text{delta}U=U_{BIAS}-U_{equi5}.$$

The resulting potentials $U_{equi}$ accordingly follow the rule $U_{equi5}>U_{equi4}>U_{equi3}>U_{equi2}>U_{equi1}$ depending on the magnitude of the exposure energy L with which the exposure element 15 exposes the photoconductor 6 at the microcells MIK.

The toner layer thicknesses on the photoconductor 6 thus vary in relation to the resulting potentials $U_{equi}$. Intermediate values of resulting potentials $U_{equi}$ can be achieved in that the intermediate steps shown in FIG. 4 are executed, which intermediate steps lead—in the exposure of the macrocell MAK—to discharge curves P and sum curves SP that have a resulting potential $U_{equi}$ as a result, which leads to toner layer thicknesses on the photoconductor 6 that are introduced proportionally between the steps shown in FIG. 5 through 10.

Given defined pigmentation of the toner that is used, the inking of an area of a recording medium 5 is proportional to the toner layer thickness of the print images. The hue value of a print image can thus be adjusted via modulation of the toner layer thickness. The following advantages can be achieved via the layer thickness modulated as illustrated above, in which sum curves SP of the discharge curves P that lie below the $U_{BIAS}$ potential are achieved via targeted exposure of microcells of the macrocells of a print raster:

Finely graded toner layer thicknesses.

No raster points are visible in the print image because the color gradation is achieved via the variation of the toner layer thickness, not via raster structure.

The edges of the print elements are thereby significantly smoother and more precise, as given printing of entire areas.

Since the development and transfer process can be unstable or prone to interference given very small hue values, due to the very thin toner layers that are thereby required, a combination of the known raster point method (U.S. Pat. No. 5,767,999 A) and of the layer thickness modulation method is also possible. For example, a transition from paper white to a predetermined hue value can be processed according to the raster method, and a layer thickness modulation can be implemented to generate greater color tone values.

Although preferred exemplary embodiments are shown and described in detail in the drawings and in the preceding specification, they should be viewed as purely exemplary and not as limiting the invention. It is noted that only preferred exemplary embodiments are shown and described, and all variations and modifications that presently or in the future lie within the protective scope of the invention should be protected.

I claim as my invention:

1. A method to adjust hue of a print image by means of a toner layer thickness in an electrophotographic printer, comprising the steps of:

charging a photoconductor element to a charge potential;

generating a potential image of the print image made up of image points via exposure and discharge of the photoconductor element by a character generator;

inking the potential image by charged toner via a developer element at a bias potential;

with the character generator generating a potential of an individual image point of a print image via local discharge of the photoconductor element, the potential of the individual image point lying between the bias potential and a potential established by a maximum achievable discharge depth of the photoconductor element so that the individual image points have same or different potentials depending on the exposure, so that the exposed area overall has a resulting potential, and a depositing of toner on this area and therefore the toner layer thickness on this area is proportional to the resulting potential;

an adjustment of the thickness of the toner layer taking place via control of an exposure strength of the area on the photoconductor element that corresponds to the print image, and wherein the bias potential remains unchanged;

the print image comprising macrocells made up of microcells, the microcells of the macrocells being exposed such that discharge curves that are thereby generated overlap, and a sum curve of the discharge curves lies at least partially in a development zone; and the exposure strength of the character generator being increased to increase the thickness of the toner layer, wherein a position of the sum curve in the development zone is shifted.

2. The method according to claim 1 in which additional microcells of the macrocell that are situated adjacent to an exposed microcell are exposed and inked differently to increase the thickness of the toner layer.

3. The method according to claim 2 in which the character generator has as exposure elements one LED per microcell, and whose exposure strength is controllable.

4. The method according to claim 3 in which the print image is generated via a raster point method given very small hue values, and the toner layer is generated via modulation of the layer thickness given larger hue values.

* * * * *